(12) United States Patent
Axmon et al.

(10) Patent No.: US 12,676,646 B2
(45) Date of Patent: Jul. 7, 2026

(54) METHOD FOR A MULTI-ANTENNA RECEIVER ARRANGEMENT, A COMPUTER PROGRAM PRODUCT, A MULTI-ANTENNA RECEIVER ARRANGEMENT, AND A WIRELESS DEVICE

(71) Applicant: BEAMMWAVE AB, Lund (SE)

(72) Inventors: Joakim Axmon, Limhamn (SE); Bengt Lindoff, Bjärred (SE)

(73) Assignee: BEAMMWAVE AB, Lund (SE)

( * ) Notice: Subject to any disclaimer, the term of this patent is extended or adjusted under 35 U.S.C. 154(b) by 0 days.

(21) Appl. No.: 18/727,904

(22) PCT Filed: Feb. 2, 2023

(86) PCT No.: PCT/SE2023/050086

§ 371 (c)(1),
(2) Date: Jul. 10, 2024

(87) PCT Pub. No.: WO2023/153979

PCT Pub. Date: Aug. 17, 2023

(65) Prior Publication Data

US 2025/0119183 A1 Apr. 10, 2025

(30) Foreign Application Priority Data

Feb. 11, 2022 (SE) .................................... 2230042-0

(51) Int. Cl.
*H04B 7/0413* (2017.01)
*H01Q 3/38* (2006.01)
*H01Q 21/00* (2006.01)

(52) U.S. Cl.
CPC .............. *H04B 7/0413* (2013.01); *H01Q 3/38* (2013.01); *H01Q 21/00* (2013.01)

(58) Field of Classification Search
CPC ......... H04B 7/0413; H01Q 21/00; H01Q 3/38
See application file for complete search history.

(56) References Cited

U.S. PATENT DOCUMENTS 9,054,845 B2 6/2015 Seyama
9,319,124 B2 4/2016 Seol et al.
(Continued)

FOREIGN PATENT DOCUMENTS

EP 4092912 A1 11/2022
WO WO-02/05456 A1 1/2002
(Continued)

OTHER PUBLICATIONS

International Search Report and Written Opinion for Application No. PCT/SE2023/050086, dated Mar. 9, 2023.
(Continued)

*Primary Examiner* — Rahel Guarino
(74) *Attorney, Agent, or Firm* — MARSHALL, GERSTEIN & BORUN LLP

(57) ABSTRACT
A method for a multi-antenna receiver arrangement, the multi-antenna receiver arrangement being comprisable in a wireless device, WD, the method comprising: receiving a first plurality of analog radio signals; converting the first plurality of analog radio signals into a first plurality of digital signals; extracting reference signals from each of the first plurality of digital signals; determining characteristics for each of the first plurality of digital signals based on the extracted reference signals; processing the first plurality of digital signals with a second plurality of spatial-temporal filters to obtain a second plurality of combined signals, wherein the first plurality is larger than the second plurality. Corresponding computer program product, multi-antenna receiver arrangement, and wireless device are also disclosed.

20 Claims, 5 Drawing Sheets

(56) References Cited

U.S. PATENT DOCUMENTS

| 2002/0154687 | A1 | 10/2002 | Bierly et al. |
| 2004/0234012 | A1* | 11/2004 | Rooyen ................ H04B 7/0854 |
| | | | 375/347 |
| 2012/0128085 | A1 | 5/2012 | Seyama |
| 2014/0056390 | A1 | 2/2014 | Seyama |
| 2014/0146861 | A1 | 5/2014 | Li et al. |
| 2018/0219587 | A1 | 8/2018 | Huo et al. |
| 2019/0089434 | A1 | 3/2019 | Rainish et al. |
| 2021/0050893 | A1 | 2/2021 | Park et al. |

FOREIGN PATENT DOCUMENTS

| WO | WO-2020052880 | A1 | 3/2020 |
| WO | WO-2021/074000 | A1 | 4/2021 |

OTHER PUBLICATIONS

Swedish Search Report for Application No. 2230042-0, dated Sep. 20, 2022.
European Search Report for Application No. 23753283, dated May 11, 2025.

* cited by examiner

METHOD FOR A MULTI-ANTENNA RECEIVER ARRANGEMENT, A COMPUTER PROGRAM PRODUCT, A MULTI-ANTENNA RECEIVER ARRANGEMENT, AND A WIRELESS DEVICE

CROSS-REFERENCE TO RELATED APPLICATION

This present application is the US national phase of International Patent Application No. PCT/SE2023/050086, filed Feb. 2, 2023, which claims priority to SE Application No. 2230042-0, filed Feb. 11, 2022. These applications are hereby incorporated by reference in their entireties.

TECHNICAL FIELD

The present disclosure relates to a method for a multi-antenna receiver arrangement, a computer program product, a multi-antenna receiver arrangement, and a wireless device.

More specifically, the disclosure relates to a method for a multi-antenna receiver arrangement, a computer program product, a multi-antenna receiver arrangement, and a wireless device as defined in the introductory parts of the independent claims.

BACKGROUND ART

Presently, there are three basic multiple-input multiple-output (MIMO) and beamforming (BF) transceiver architectures:

Analog BF, in which the radio signals from antennas are combined in the analog domain. This architecture may have problems, such as slow beam tracking, and that there is no channel knowledge per antenna, as only the combined channel is known. An example of analog BF can be found in US 2021/050893 A1.

Hybrid BF, in which radio signals of a subset of antennas is combined in the analog domain to combined streams and the combined streams are analog-to-digital (AD) converted and further combined in the digital domain. An example of hybrid BF can be found in U.S. Pat. No. 9,319,124 B2.

Digital BF, in which all streams are AD converted and combined in the digital domain. In digital BF there is full channel knowledge for all antennas. However, processing may be very complex and/or power consuming, e.g., if the number of antennas is large. An example of digital BF can be found in U.S. Pat. No. 9,054,845 B2.

Furthermore, from WO 2020/052880 A1 it is known that if all signals from the antennas are AD converted, synchronization signals for each antenna are extracted (e.g., on a periodical basis) and concatenated together with a combined signal (comprising all the received radio signals from the antennas), and the concatenated information is sent over a digital interface to a baseband unit, performance will be better than for analog BF, but not as good as for pure digital BF, which has high complexity/power consumption.

Thus, there may be a need for methods and/or apparatuses which performs equally or almost equally well as digital BF, while having lower complexity/power consumption than digital BF.

SUMMARY

An object of the present disclosure is to mitigate, alleviate or eliminate one or more of the above-identified deficiencies and disadvantages in the prior art and solve at least the above-mentioned problem.

According to a first aspect there is provided a method for a multi-antenna receiver arrangement, the multi-antenna receiver arrangement being comprisable in a wireless device, WD. The method comprises: receiving a first plurality of analog radio signals; converting the first plurality of analog radio signals into a first plurality of digital signals; extracting reference signals from each of the first plurality of digital signals; determining characteristics for each of the first plurality of digital signals based on the extracted reference signals; processing the first plurality of digital signals with a second plurality of spatio-temporal filters to obtain a second plurality of combined signals, wherein the first plurality is larger than the second plurality.

According to some embodiments, the method further comprises transforming each of the second plurality of combined signals into a frequency domain.

According to some embodiments, the method further comprises post-processing the transformed signals in the frequency domain to obtain a third plurality of frequency domain processed signals.

According to some embodiments, the method further comprises decoding the third plurality of frequency domain processed signals.

According to some embodiments, the second plurality is larger than the third plurality.

According to some embodiments, the spatio-temporal filters are combining filters.

According to some embodiments, the spatio-temporal filters are prefilters.

According to some embodiments, the method further comprises utilizing the determined characteristics to determine parameters for the spatio-temporal filters, the prefilters, or the combining filters.

According to some embodiments, the first plurality of analog radio signals is received by a first plurality of receivers/transceivers (500, 501, . . . , 515) via a first plurality of antenna units, and each of the combining filters is a one tap filter and each of the one tap filters is associated with determined characteristics, such as a (complex-valued) coefficient, a phase shift and/or a delay, of one of the first plurality of digital signals.

According to a second aspect there is provided a computer program product comprising instructions, which, when executed on at least one processor of a processing device, cause the processing device to carry out the method according to the first aspect or any of the above-mentioned embodiments.

According to a third aspect there is provided a non-transitory computer-readable storage medium storing one or more programs configured to be executed by one or more processors of a processing device, the one or more programs comprising instructions which, when executed by the processing device, causes the processing device to carry out the method according to the first aspect or any of the above-mentioned embodiments. According to a fourth aspect there is provided a multi-antenna receiver arrangement. The multi-antenna receiver arrangement comprises controlling circuitry configured to cause: reception of a first plurality of analog radio signals; conversion of the first plurality of analog radio signals into a first plurality of digital signals; extraction of reference signals from each of the first plurality of digital signals; determination of characteristics for each of the first plurality of digital signals based on the extracted reference signals; utilization of the determined characteristics to determine parameters for a second plurality of spatio-temporal filters; and processing of the first plurality of digital signals with a second plurality of spatio-temporal filters to obtain a second plurality of combined signals, wherein the first plurality is larger than the second plurality.

According to some embodiments, the multi-antenna receiver arrangement comprises: a first plurality of receivers/transceivers configured to receive the first plurality of analog radio signals via a first plurality of antenna units; a fourth plurality, such as a first plurality, of analog-to-digital converters configured to convert the first plurality of analog radio signals into a first plurality of digital signals; an extraction unit configured to extract reference signals from each of the first plurality of digital signals; a channel analyzer configured to determine characteristics for each of the first plurality of digital signals based on the extracted reference signals; and a second plurality of spatio-temporal filters configured to process the first plurality of digital signals to obtain a second plurality of combined signals, wherein the first plurality is larger than the second plurality.

According to some embodiments, the multi-antenna receiver arrangement further comprises a transform unit configured to transform each of the second plurality of combined signals into a frequency domain.

According to some embodiments, the multi-antenna receiver arrangement further comprises a post-processing unit configured to post-process the transformed signals in the frequency domain to obtain a third plurality of frequency domain processed signals.

According to some embodiments, the multi-antenna receiver arrangement further comprises a decoder configured to decode the third plurality of frequency domain processed signals.

According to some embodiments, the second plurality is larger than the third plurality.

According to some embodiments, the multi-antenna receiver arrangement comprises a chip, the chip comprising the extraction unit, the channel analyzer, the second plurality of spatio-temporal filters and the transform unit.

According to some embodiments, the multi-antenna receiver arrangement comprises a first chip, the first chip comprising the channel analyzer, the transform unit, and optionally the post-processing unit and optionally the decoder; a second chip, the second chip comprising the extraction unit and the second plurality of spatio-temporal filters; and a digital interface, DI, configured to interface the first and second chips.

According to a fifth aspect there is provided a wireless device (WD) comprising the multi-antenna receiver arrangement of the third aspect or any of the above-mentioned embodiments.

Effects and features of the second, third, fourth, and fifth aspects are fully or to a large extent analogous to those described above in connection with the first aspect and vice versa. Embodiments mentioned in relation to the first aspect are fully or largely compatible with the second, third, fourth, and fifth aspects and vice versa.

An advantage of some embodiments is that power consumption is reduced or optimized (for the wireless device), e.g., since fewer digital streams needs to be transmitted via a digital interface.

Another advantage of some embodiments is a reduced complexity, e.g., since fewer transforms are needed due to fewer channels/streams.

Yet another advantage of some embodiments is a reduced complexity and power consumption, e.g., if the signals from all antennas are combined there is no need to select groups of antennas, thus reducing power consumption (for processing units) and reducing the complexity of the system.

Yet another advantage of some embodiments is that energy efficiency is increased or improved.

A further advantage of some embodiments is that implementation is simplified.

The present disclosure will become apparent from the detailed description given below. The detailed description and specific examples disclose preferred embodiments of the disclosure by way of illustration only. Those skilled in the art understand from guidance in the detailed description that changes, and modifications may be made within the scope of the disclosure.

Hence, it is to be understood that the herein disclosed disclosure is not limited to the particular component parts of the device described or steps of the methods described since such apparatus and method may vary. It is also to be understood that the terminology used herein is for purpose of describing particular embodiments only and is not intended to be limiting. It should be noted that, as used in the specification and the appended claims, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The above objects, as well as additional objects, features, and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1A:
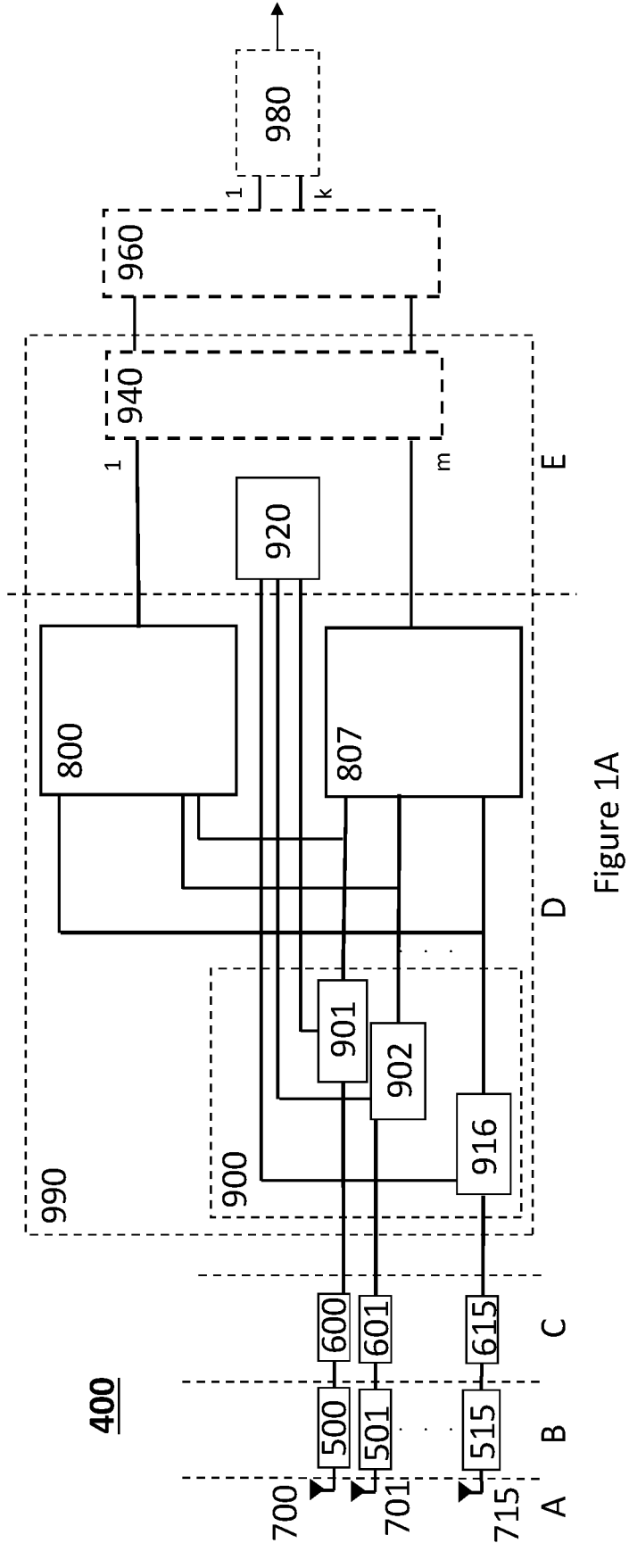
FIG. 1A is a schematic drawing illustrating a multi-antenna receiver arrangement according to some embodiments.

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Terminology

Below is referred to millimeter (mmW) operation, mmW communication, mmW communication capability and mmW frequency range. The mmW frequency range is from 24.25 Gigahertz (GHz) to 71 GHz or more generally from 24 to 300 GHz. MmW may also be referred to as Frequency Range 2 (FR2).

Below is referred to a "transceiver node" (TNode). A TNode may be a radio unit (RRU), a repeater, a wireless node, or a base station (BS), such as a radio base station (RBS), a Node B, an Evolved Node B (eNB) or a gNodeB (gNB). Thus, a TNode may be a NW node. Furthermore, a TNode may be a BS for a neighbouring cell, a BS for a handover (HO) candidate cell, a radio unit (RRU), a distributed unit (DU), another WD (e.g., a remote WD) or a base station (BS) for a (active/deactivated) secondary cell (SCell) or for a serving/primary cell (PCell, e.g., associated with an active TCI state), a laptop, a wireless station, a relay, a repeater device, a reconfigurable intelligent surface, or a large intelligent surface.

Below is referred to a processor/processing unit. The processor may be a digital processor. Alternatively, the processor may be a microprocessor, a microcontroller, a central processing unit, a co-processor, a graphics processing unit, a digital signal processor, an image signal processor, a quantum processing unit, or an analog signal processor. The processing unit may comprise one or more processors and optionally other units, such as a control unit. Thus, the processor may be implemented as a single-processor, a dual-processor system, or a multiprocessor system. Furthermore, the invention can also be practiced in distributed computing environments where certain tasks are performed by remote processing devices that are linked through a communications network, e.g., 5G, to one or more local processors. In a distributed computing environment, program modules can be located in both local and remote memory storage devices. Moreover, some processing (e.g., for the data plane) may be moved to a centralized node, such as a centralized transceiver node (TNode). For example, baseband processing and/or higher layer processing, such as processing at layers above the physical layer, may be moved to a cloud, such as an mmW RAN cloud (wherein processing is performed by cloud processors). Such a (mmW) cloud deployment may bring significant cost savings to the operator due to centralized processing, collaborative radio processing, and availability of cheap commodity hardware.

Below is referred to a wireless device (WD). A wireless device is any device capable of transmitting or receiving signals wirelessly. Some examples of wireless devices are user equipment (UE), mobile phones, cell phones, smart phones, Internet of Things (IoT) devices, vehicle-to-everything (V2X) devices, vehicle-to-infrastructure (V2I) devices, vehicle-to-network (V2N) devices, vehicle-to-vehicle (V2V) devices, vehicle-to-pedestrian (V2P) devices, vehicle-to-device (V2D) devices, vehicle-to-grid (V2G) devices, fixed wireless access (FWA) points, and tablets.

Below is referred to a digital interface. A digital interface is a unit converting analog signals from e.g., transceivers to digital signals, which digital signals are conveyed to e.g., a baseband processor, and/or converting digital signals from e.g., a baseband processor to analog signals, which analog signals are conveyed to e.g., one or more transceivers. A digital interface possible also comprises filters and other pre-processing functions/units.

Below is referred to an antenna unit. An antenna unit may be one single antenna. However, an antenna unit may also be a dual antenna, such as a dual patch antenna with a first (e.g., horizontal) and a second (e.g., vertical) polarization, thus functioning as two separate antennas or an antenna unit having two ports.

Below is referred to a chip. A chip is an integrated circuit (chip) or a monolithic integrated circuit (chip) and may also be referred to as an IC, or a microchip.

Herein is referred to Frequency range/band 1 (FR1) utilization, FR1 GHz communication, FR1 communication capability and/or FR1 frequency range/band. FR1 may also be referred to as sub 6 GHz. The sub 6 GHz frequency range/band may comprise the interval from 0.5 to 6 GHz. Furthermore, in some embodiments, FR1 may equally well be referred to as a sub 7 GHz frequency range/band, especially if the range/band comprises one or more ranges/bands in the range from 6 to 7 GHz. The sub 7 GHz frequency range/band may comprise the interval from 0.5 to 7 GHz. Moreover, in some embodiments, FR1 may equally well be referred to as a sub 8 GHz frequency range/band, especially if the range/band comprises one or more ranges/bands in the range from 6 (or 7) to 8 GHz, such as U6G, which comprises a licensed NR band in the range from 6.425 to 7.125 GHz. The sub 8 GHz frequency range/band may comprise the interval from 0.5 to 8 GHz. Thus, FR1 may comprise one or more of sub 6 GHz, sub 7 GHz, and sub 8 GHz (frequency range/band). Alternatively, FR1, the sub 6 GHz, the sub 7 GHz, or the sub 8 GHz frequency range/band may be referred to as a sub mmW frequency range/band.

A basic concept of the invention is a two-step beamforming (BF) procedure for a multi-antenna receiver architecture (with N antennas) for Massive-MIMO and/or beamforming, which is suitable for the mmW frequency range of the radio spectrum. The two-step BF procedure is also suitable for other radio frequencies, such as frequencies below 24 GHz, e.g., when a large/massive amount of transceivers is utilized. In one embodiment, the first BF processing stage of the N digital signals is performed in time domain creating m streams and the second BF processing stage is performed in frequency domain to process the m streams to one or more layers of data streams (that may be MIMO layers) that then can be further processed.

Figure 1B:
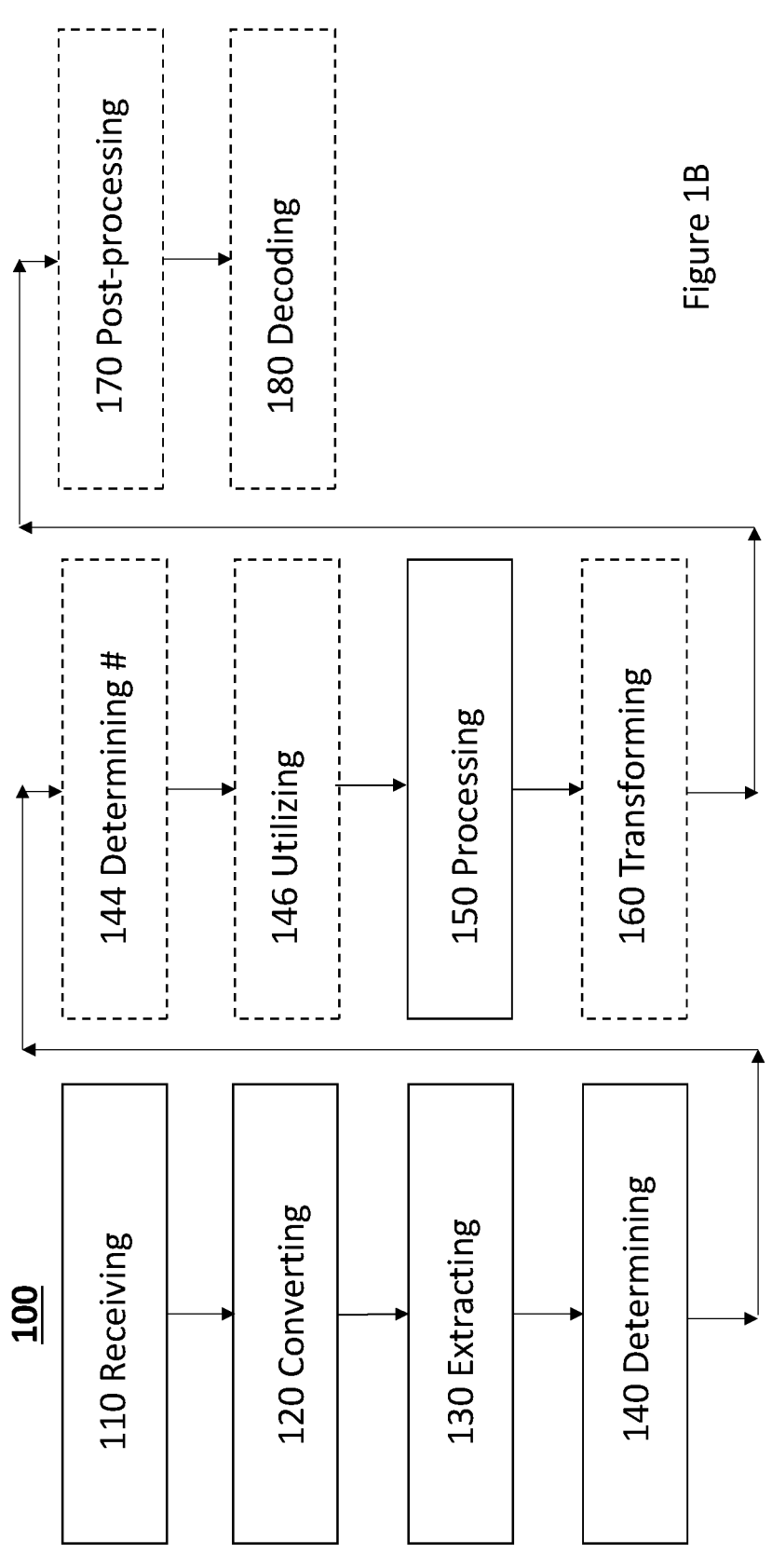
FIG. 1B is a flowchart illustrating method steps according to some embodiments.

In the following, embodiments will be described where FIG. 1A illustrates a multi-antenna receiver arrangement according to some embodiments and FIG. 1B illustrates method steps according to some embodiments. The method 100 is for a multi-antenna receiver arrangement 400. The multi-antenna receiver arrangement 400 is comprisable or comprised in a wireless device, WD. In some embodiments, the multi-antenna receiver arrangement is or comprises a multi-antenna unit multiple-input multiple-output (MIMO) receiver arrangement. As seen in FIG. 1A, the multi-antenna receiver arrangement 400 comprises a first plurality N of receivers/transceivers 500, 501, . . . , 515 configured to receive the first plurality (N) of analog radio signals via a first plurality (N) of antenna units 700, 701, . . . , 715. In some embodiments, the multi-antenna receiver arrangement 400 comprises the first plurality (N) of antenna units 700, 701, . . . , 715 (for receiving the analog radio signals). Furthermore, the multi-antenna receiver arrangement 400 comprises a fourth plurality (I) of analog to digital converters (ADCs) 600, 601, . . . , 615 configured to convert the first plurality (N) of analog radio signals into a first plurality (N) of digital (baseband) signals. The fourth plurality (I) may be equal to the first plurality (N), i.e., there is one ADC for each receiver/transceiver/analog signal. However, in other embodiments, the fourth plurality is twice as large as the first plurality (i.e., 2N), i.e., there are two ADCs for each analog signal, e.g., one for an in-phase (I) branch and one for a quadrature phase (Q) branch. Moreover, the multi-antenna receiver arrangement 400 comprises an extraction unit 900 configured to extract physical resources used for estimating channel characteristics, such as reference signals, from each of the first plurality (N) of digital signals. In some embodiments, the extraction unit 900 comprises a first plurality (N)

of sub-extraction units 901, 902, . . . , 916, i.e., one sub-extraction unit for each digital signal. The multi-antenna receiver arrangement 400 comprises a channel analyzer 920. The channel analyzer 920 is configured to determine characteristics for each of the first plurality (N) of digital signals based on the extracted reference signals. Furthermore, the multi-antenna receiver arrangement 400 comprises a second plurality m of spatio-temporal filters 800, . . . , 807. The spatio-temporal filters 800, . . . , 807 are configured to process or processes the first plurality (N) of digital signals to obtain a second plurality (m) of combined signals. The first plurality (N) is larger/greater than the second plurality (m). In some embodiments, the second plurality (m) is 2 or larger, e.g., 3. In these embodiments, the first plurality is 3 or larger, e.g., 16. In some embodiments, the multi-antenna receiver arrangement 400 comprises a transform unit 940. The transform unit 940 is configured to transform or transforms each of the second plurality (m) of combined signals into a frequency domain. In some embodiments, the transform unit 940 is or comprises a second plurality (m) of transform sub-units. Each transform sub-unit is configured (connected and otherwise adapted) to process a respective signal of the second plurality (m) of combined signals. In some embodiments, the transform unit transforms each of the combined signals in a serial manner. In some embodiments, a second plurality of transform sub-units process N/m signals each. Furthermore, in some embodiments, the multi-antenna receiver arrangement 400 comprises a post-processing unit 960. The post-processing unit 960 is configured to post-process or post-processes the transformed signals in the frequency domain to obtain a third plurality k of frequency domain processed signals. Moreover, in some embodiments, the first plurality (N) of analog radio signals is coded. Thus, in some embodiments, the multi-antenna receiver arrangement 400 comprises a decoder 980. The decoder 980 is configured to decode or decodes the third plurality (k) of frequency domain processed signals (in order to obtain information signals). The second plurality (m) is larger/greater than the third plurality (k).

In some embodiments, the multi-antenna receiver arrangement 400 comprises a chip 990, such as a baseband chip. The chip 990 comprises the extraction unit 900, the channel analyzer 920, the second plurality of spatio-temporal filters 800, . . . , 807, the transform unit 940, optionally the post-processing unit 960, optionally the decoder 980 and optionally the ADCs 600, 601, . . . , 615. By embedding the extraction unit 900, the channel analyzer 920, the second plurality of spatio-temporal filters 800, . . . , 807, the transform unit 940, and optionally the post-processing unit 960, the decoder 980 and the ADCs 600, 601, . . . , 615 in one single chip (e.g., instead of two chips), less data needs to be sent from one chip to another (and less interfacing is needed), thus saving power and/or reducing complexity. In some embodiments, the multi-antenna receiver arrangement 400 comprises a first chip, a second chip and a digital interface, DI. The first chip comprises the channel analyzer 920, the transform unit 940, optionally the post-processing unit 960 and optionally the decoder 980 (i.e., the first chip comprises the part E in FIG. 1A with or without the post-processing unit 960 and the decoder 980). The second chip comprises the extraction unit 900, the second plurality of spatio-temporal filters 800, . . . , 807 and optionally the ADCs 600, 601, . . . , 615 (i.e., the second chip comprises the part D and possibly the part C in FIG. 1A). The DI is configured to interface (function as an interface between) the first and second chips, i.e., transmitting/transferring/relaying/conveying signals and necessary signalling/control bits between the first and second chips, e.g., receiving the m combined signals from the second chip and conveying extracted reference signals and the received m combined signals to the first chip. In some embodiments, the channel taps (or information related thereto, such as filter coefficients and delay) are sent from the first chip to the second chip. Furthermore, in some embodiments, data is transmitted over the DI either in serial or parallel fashion.

In some embodiments, the multi-antenna receiver arrangement 400 comprises a third chip (or a set of third chips). The third chip comprises the first plurality (N) of antenna units 700, 701, . . . , 715, which are internal and/or external antenna units. Alternatively, the third chip comprises internal antenna units and/or is connected/connectable to external antenna units. Furthermore, the third chip comprises the first plurality (N) of receivers/transceivers 500, 501, . . . , 515. Alternatively, each third chip of the set of third chips comprises a respective antenna unit 700, 701, . . . , 715 or a subset of the antenna units 700, 701, . . . , 715 (external and/or internal antenna units; alternatively, the third chip comprises internal antenna units and/or is connected/connectable to external antenna units) and a respective receiver/transceiver 500, 501, . . . , 515. The third chip (or each third chip) comprises, in some embodiments, an analog interface compatible with/connectable to the second chip. In some embodiments, the channel analyzer 920 is comprised in the second chip instead of in the first chip. Thus, less information needs to be transmitted between the first and second chips.

As seen in FIG. 1B, the method 100 comprises receiving 110 a first plurality N of analog radio signals, e.g., via antenna units 700, 701, . . . , 715 (or via antenna panels) connected/connectable to a first plurality (N) of receivers/transceivers 500, 501, . . . , 515, such as front end receivers/transceivers. Thus, the receivers/transceivers 500, 501, . . . , 515 receives the first plurality N of analog radio signals. In some embodiments, the analog radio signals may be down-converted to baseband signals. Furthermore, the method 100 comprises converting 120 the first plurality (N) of analog radio signals into a first plurality (N) of digital signals (channels). In some embodiments, the converting 120 is performed by a first plurality (N) of analog-to-digital converters (ADCs) 600, 601, . . . , 615 (connected to the receivers/transceivers 500, 501, . . . , 515), i.e., one per analog radio signal. Furthermore, in some embodiments, the converting 120 is performed by 2N (twice the first plurality) ADCs 600, 601, . . . , 615, i.e., two ADCs for each analog radio signal, e.g., one ADC for an I branch and one ADC for a Q branch (of each analog radio signal). Moreover, the method 100 comprises extracting 130 physical resources used for estimating channel characteristics, such as reference signals (RSs) from each of the first plurality (N) of digital signals. Extracting 130 may be performed on a regular basis, e.g., every 1, 2, 5, 10, 20, 40, 80, or 160 ms. The RS may be a channel state information reference signal (CSI-RS), a demodulation reference signal (DM-RS), a primary/secondary synchronization signal (PSS/SSS) transmitted in synchronization signal blocks (SSBs), or data symbols or a combination of these types of signals/symbols. Furthermore, the timing of the RSs may be tracked by a control unit. Once extracted, the RSs may be sent to a channel analyzer 920. The channel analyzer 920 analyzes all of the first plurality (N) of digital signals (to determine characteristics). The channel analyzer 920 may be comprised in a baseband processing unit. The method comprises determining (or obtaining) 140 characteristics for each of the first plurality (N) of digital signals based on the extracted reference signals. In some embodiments, the characteristics is determined as a correlation between reference signal(s) and digital signal(s), e.g., the channel analyzer 920 is a matched filter. In some embodiments, the characteristics is a (time domain) radio channel characteristics. In some embodiments, the characteristics comprises channel estimates, such as radio channel estimates, e.g., for each of the digital signals.

In some embodiments, the method 100 comprises determining 144 a number of streams m, i.e., a second plurality (m) of streams (to be sent for transformation). The determining 144 is, in some embodiments, based on the possibility to compress the digital signals, i.e., based on how compressible the digital signals are, e.g., based on how many filter taps the radio channel consist of or can be modelled by, how many MIMO layers that can be transmitted to the mobile device and/or spatial relationship between the radio channels and the respective antenna units). The determining may be performed by the channel analyzer 920. In some embodiments, the second plurality (m) is determined based on the power delay profiles (pdfs) of the (analog) radio signals, and/or based on the number of MIMO layers possible to transmit over the (analog) radio signals. Alternatively, the second plurality (m) is fixed (e.g., 1, 2, 3, 4, 6, 8, 12).

Furthermore, the method 100 comprises processing 150 the first plurality (N) of digital signals with a second plurality (m) of spatio-temporal filters to obtain a second plurality (m) of combined signals. In some embodiments, the processing 150 comprises combining the first plurality (N) of digital signals with a second plurality (m) of spatio-temporal filters. The spatio-temporal filters are, in some embodiments, 2D filters, and the processing 150 is performed in time and/or space domain (as the antenna units may be distributed over a specific space and the spatial relation between different antenna units is known). The first plurality is larger than the second plurality, i.e., N is larger than m. By obtaining fewer combined signals than received analog radio signals, reduction of power consumption and/or reduction of complexity is enabled, e.g., since fewer digital streams needs to be transmitted (e.g., via a digital interface) and/or since fewer transforms are needed (for the transform unit) due to fewer channels/streams.

In some embodiments, the method 100 further comprises transforming 160 each of the second plurality of combined signals into a frequency domain or a complex frequency domain. In some embodiments, the transforming 160 comprises Discrete Fourier Transforming (DFT), Fast Fourier transforming (FFT), Laplace transforming, Wavelet transforming and/or Z-transforming. Preferably, the transforming 160 comprises FFT. By transforming fewer combined signals than received analog radio signals, power consumption and/or complexity is reduced, e.g., since fewer transforms are needed due to fewer channels/streams. Furthermore, in some embodiments, the method 100 comprises post-processing 170 the transformed signals in the (complex) frequency domain to obtain a third plurality k of frequency domain processed signals. The post-processing 170 comprises, in some embodiments, combining the transformed signals in the (complex) frequency domain. Thus, in some embodiments, the spatio-temporal filters are combining filters. In these embodiments, the method 100 comprises utilizing 146 the determined characteristics to determine parameters or parameter values for the combining filters (and utilizing the determined parameters for the filters, e.g., the combining filters). In some embodiments, each of the combining filters is a one tap filter, i.e., a Finite Impulse Response (FIR) tapped delay line filter with one tap. Each of the one tap filters is associated with determined characteristics, such as the characteristics determined for a digital signal during the determining step 140. In some embodiments, the determined characteristics is a phase shift, a (complex-valued) coefficient and/or a delay (of one of the first plurality of digital signals). By implementing the combining filters as one tap filters, memory requirements may be reduced and/or the number of calculations required is reduced, thus reducing power consumption. In some embodiments, the method 100 does not comprise utilizing 146 the determined characteristics to determine parameters for the filters (e.g., combining filters or prefilters). Instead, the method 100 comprises utilizing pre-determined parameters for the filters (e.g., combining filters or prefilters). Alternatively, the method comprises utilizing randomized parameters for the filters (e.g., combining filters or prefilters). Alternatively, or additionally, the method comprises having a remote transceiver node (Tnode), such as a base station (gNB or eNB), analyze the parameters and send the parameters (to be utilized) via FR2/secondary cell (SCell) to FR1/primary cell (PCell). Thus, in some embodiments, the method 100 comprises, at a remote transceiver node (TNode), analyzing and/or determining parameters for the filters (e.g., combining filters or prefilters). Furthermore, in some embodiments, the method 100 comprises receiving (by the multi-antenna receiver arrangement 400) the parameters for the filters (e.g., combining filters or prefilters) from the remote TNode. Moreover, in some embodiments, the method 100 comprises utilizing the received parameters for the filters (e.g., combining filters or prefilters).

Moreover, in some embodiments, the first plurality (N) of analog radio signals is coded, e.g., prior to transmission of the analog radio signals. Thus, in some embodiments, the method 100 comprises decoding 180 the third plurality (k) of frequency domain processed signals. Thus, a third plurality (k) of decoded signals, i.e., information signals, is obtained. In some embodiments, the second plurality is larger than the third plurality, i.e., m is larger than k. By decoding fewer signals than the combined signals, power consumption and/or complexity is reduced, e.g., for the decoding circuits/decoder(s) performing the decoding 180.

In some embodiments, the method steps of receiving 110, converting 120, extracting 130, determining 140, utilizing 146 and processing 150 and optionally the method steps of determining 144, transforming 160, post-processing 170 and decoding 180 are performed in the order indicated in FIG. 1B, i.e., receiving 110 is followed by converting 120, converting 120 is followed by extracting 130, extracting 130 is followed by determining 140, determining 140 is followed by utilizing 146 and utilizing 146 is followed by processing 150. Alternatively, receiving 110 is followed by converting 120, converting 120 is followed by extracting 130, extracting 130 is followed by determining 140, determining 140 is followed by determining 144, determining 144 is followed by utilizing 146, and utilizing 146 is followed by processing 150. Optionally processing 150 is followed by transforming 160, optionally transforming 160 is followed by post-processing 170, and optionally post-processing 170 is followed by decoding 180. Thus, in some embodiments the extracting 130 is performed at a first time instant, the determining 140 is performed at a second time instant, utilizing 146 is performed at a third time instant, and processing 150 is performed at a fourth time instant. In some embodiments, the second time instant follows (after) the first time instant. Furthermore, in some embodiments, the third time instant follows (after) the second time instant. Moreover, in some embodiments, the fourth time instant follows (after) the third time instant.

Figure 2:
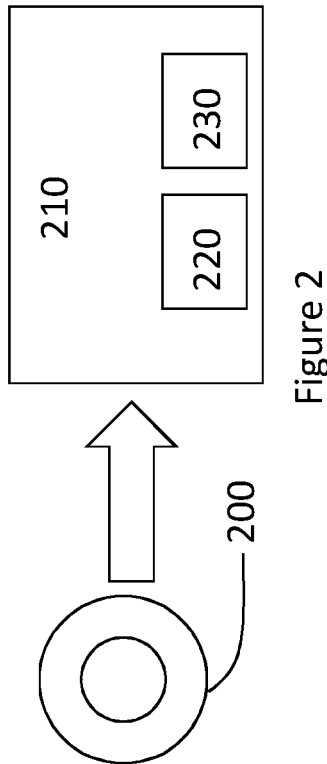
FIG. 2 is a schematic drawing illustrating a computer readable medium according to some embodiments.

According to some embodiments, a computer program product comprising a non-transitory computer readable medium 200, such as a punch card, a compact disc (CD) ROM, a read only memory (ROM), a digital versatile disc (DVD), an embedded drive, a plug-in card, or a universal serial bus (USB) memory, is provided. FIG. 2 illustrates an example computer readable medium in the form of a compact disc (CD) ROM 200. The computer readable medium has stored thereon, a computer program comprising program instructions. The computer program is loadable into a data processor (PROC) 220, which may, for example, be comprised in a computer 210 or a computing device or the multi-antenna receiver arrangement 400. When loaded into the data processor, the computer program may be stored in a memory (MEM) 230 associated with or comprised in the data processor. According to some embodiments, the computer program may, when loaded into and run by the data processor, cause execution of method steps according to, for example, the method illustrated in FIG. 1B, which is described herein. Furthermore, in some embodiments, there is provided a computer program product comprising instructions, which, when executed on at least one processor of a processing device, cause the processing device to carry out the method illustrated in FIG. 1B. Moreover, in some embodiments, there is provided a non-transitory computer-readable storage medium storing one or more programs configured to be executed by one or more processors of a processing device, the one or more programs comprising instructions which, when executed by the processing device, causes the processing device to carry out the method illustrated in FIG. 1B.

Figure 3:
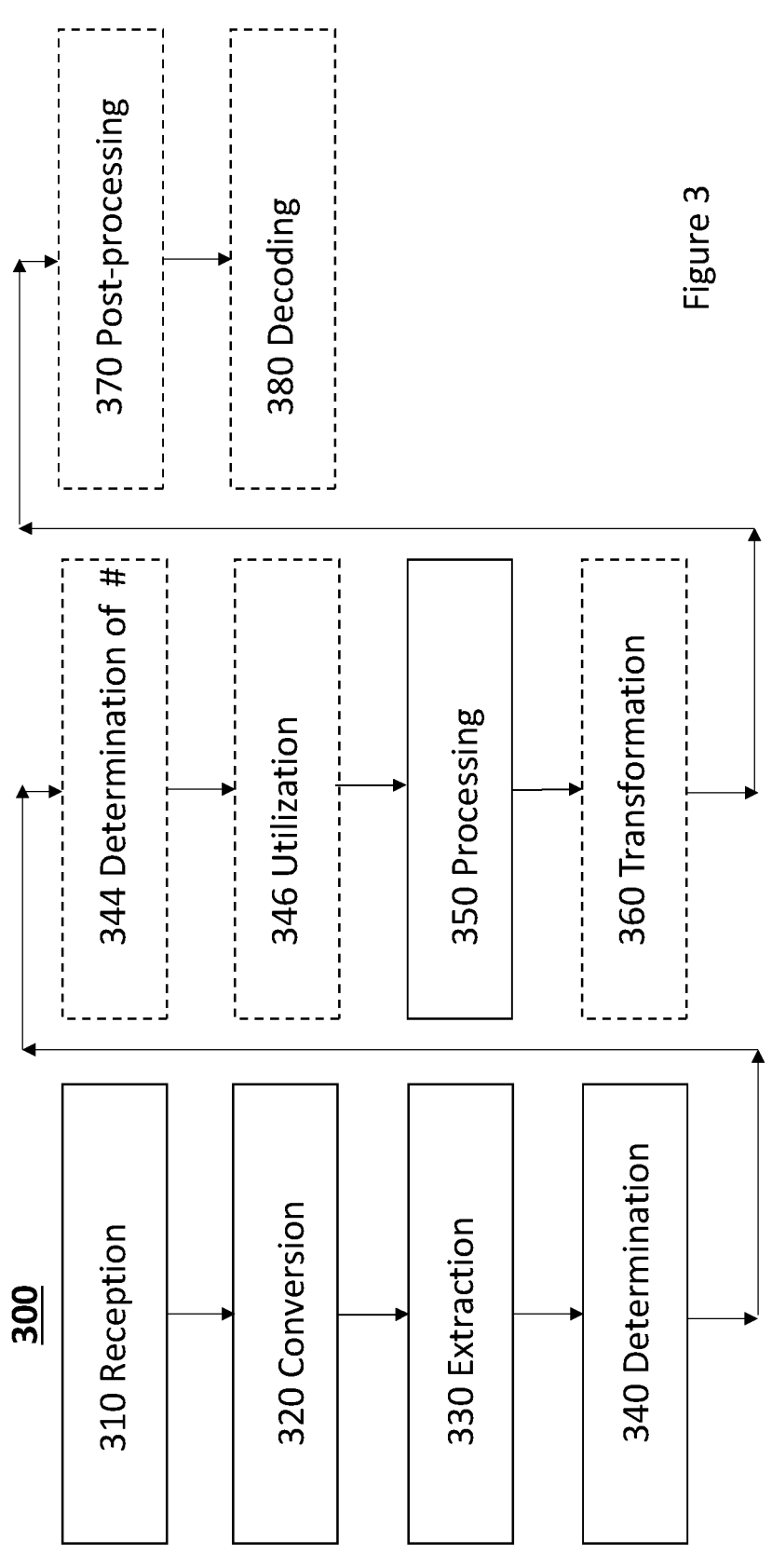
FIG. 3 is a flowchart illustrating method steps implemented in a multi-antenna receiver arrangement (or a processing unit thereof) according to some embodiments.

FIG. 3 illustrates method steps implemented in a multi-antenna receiver arrangement 400 or in an apparatus associated with (connected or connectable to) the multi-antenna receiver arrangement 400 according to some embodiments. The apparatus/multi-antenna receiver arrangement is comprised or comprisable in a wireless device (WD). Furthermore, the apparatus/multi-antenna receiver arrangement comprises controlling circuitry. The controlling circuitry is configured to cause reception 310 of a first plurality N of analog radio signals. To this end, the controlling circuitry may be associated with (e.g., operatively connectable, or connected, to) one or more reception units (e.g., receiving circuitry or a first plurality of receivers/transceivers 500, 501, . . . , 515). Furthermore, the controlling circuitry is configured to cause conversion 320 of the first plurality of analog radio signals into a first plurality of digital signals. To this end, the controlling circuitry may be associated with (e.g., operatively connectable, or connected, to) one or more conversion units (e.g., converting circuitry or a first/fourth plurality of ADCs 600, 601, . . . , 615). Moreover, the controlling circuitry is configured to cause extraction 330 of reference signals from each of the first plurality of digital signals. To this end, the controlling circuitry may be associated with (e.g., operatively connectable, or connected, to) one or more extraction units (e.g., extracting circuitry or the extraction unit 900 or a first/fourth plurality of ADCs sub-extraction units 901, 902, . . . , 916). The controlling circuitry is configured to cause determination 340 of characteristics for each of the first plurality of digital signals based on the extracted reference signals. To this end, the controlling circuitry may be associated with (e.g., operatively connectable, or connected, to) one or more determination units (e.g., determining circuitry or a channel analyzer 920). Furthermore, the controlling circuitry is configured to cause processing 350 of the first plurality of digital signals to obtain a second plurality of combined signals, wherein the first plurality is larger than the second plurality. To this end, the controlling circuitry may be associated with (e.g., operatively connectable, or connected, to) one or more processing units (e.g., processing circuitry or the second plurality of spatio-temporal filters 800, . . . , 807).

Furthermore, in some embodiments, the controlling circuitry is configured to cause determination 344 of a number of streams m, i.e., a second plurality (m) of streams (to be sent for transformation). To this end, the controlling circuitry may be associated with (e.g., operatively connectable, or connected, to) one or more determination units (e.g., determining circuitry or the channel analyzer 920). Moreover, in some embodiments, the controlling circuitry is configured to cause utilization 346 of the determined characteristics to determine parameters or parameter values for the combining filters. To this end, the controlling circuitry may be associated with (e.g., operatively connectable, or connected, to) one or more utilization units (e.g., utilizing circuitry or the channel analyzer 920). In some embodiments, the controlling circuitry is configured to cause transformation 360 of each of the second plurality of combined signals into a frequency domain or a complex (or complex-valued) frequency domain. To this end, the controlling circuitry may be associated with (e.g., operatively connectable, or connected, to) one or more transform units (e.g., transforming circuitry or the transform unit 940 or the transform sub-units thereof). Furthermore, in some embodiments, the controlling circuitry is configured to cause post-processing 370 of the transformed signals in the (complex) frequency domain to obtain a third plurality k of frequency domain processed signals. To this end, the controlling circuitry may be associated with (e.g., operatively connectable, or connected, to) one or more post-processing units (e.g., post-processing circuitry or the post-processing unit 960). Moreover, in some embodiments, the controlling circuitry is configured to cause decoding 380 of the third plurality (k) of frequency domain processed signals. Thus, a third plurality of decoded signals are obtained. To this end, the controlling circuitry may be associated with (e.g., operatively connectable, or connected, to) one or more decoding units (e.g., decoding circuitry or the decoder 980). In some embodiments, the controlling circuitry is configured to cause repetition of the steps 310, 320, 330, 340, 350 and optionally repeating one or more of the steps 344, 346, 360, 370, and 380. To this end, the controlling circuitry may be associated with (e.g., operatively connectable, or connected, to) a repetition unit (e.g., repetition circuitry or a repeater).

Figure 4:
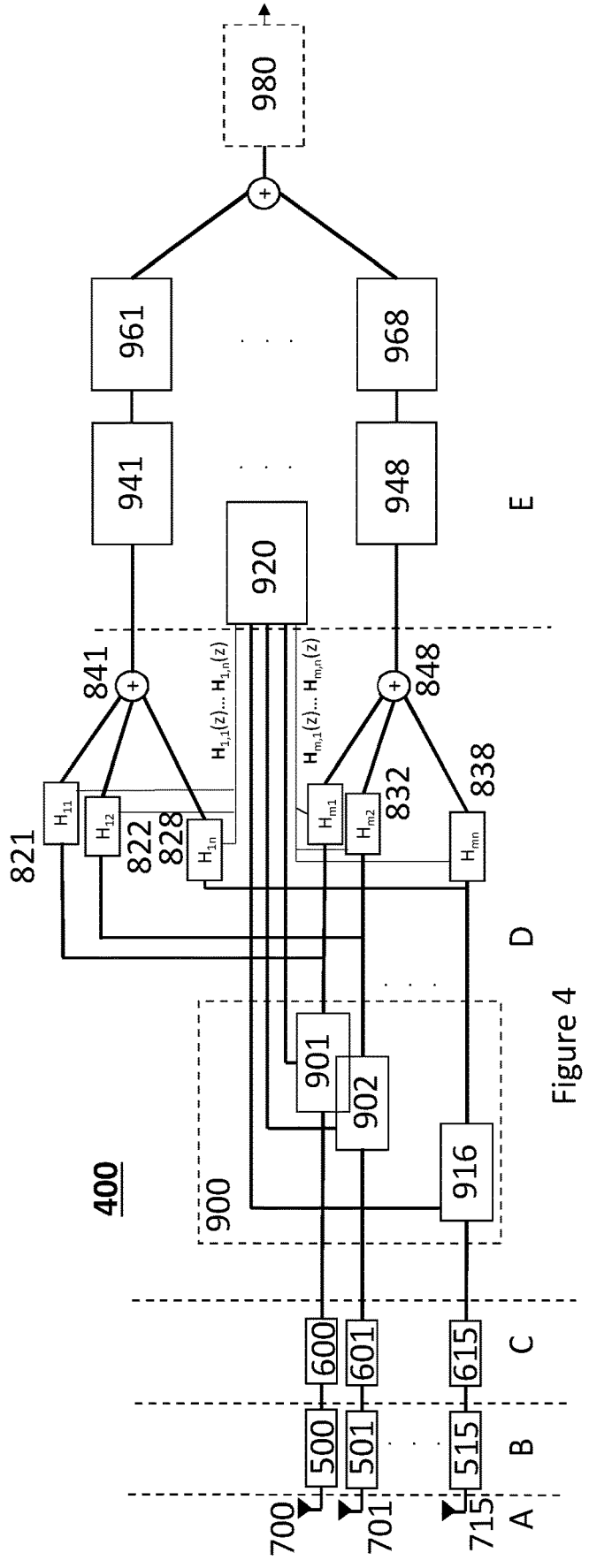
FIG. 4 is a schematic drawing illustrating a multi-antenna receiver arrangement according to some embodiments.

FIG. 4 illustrates a multi-antenna receiver arrangement according to some embodiments. The multi-antenna receiver arrangement 400 depicted in FIG. 4 comprises a first plurality N of receivers/transceivers 500, 501, . . . , 515 configured to receive the first plurality (N) of analog radio signals via a first plurality (N) of antenna units 700, 701, . . . , 715. In some embodiments, the multi-antenna receiver arrangement 400 comprises the first plurality (N) of antenna units 700, 701, . . . , 715 (for receiving the analog radio signals). Furthermore, the multi-antenna receiver arrangement 400 comprises a fourth plurality (I) of analog to digital converters (ADCs) 600, 601, . . . , 615 configured to convert the first plurality (N) of analog radio signals into a first plurality (N) of digital (baseband) signals, that may be complex-valued digital baseband signals. Moreover, the multi-antenna receiver arrangement 400 comprises an extraction unit 900 configured to extract reference signals from each of the first plurality (N) of digital signals. In some embodiments, the extraction unit 900 comprises a first plurality (N) of sub-extraction units 901, 902, . . . , 916, i.e., one sub-extraction unit for each digital signal. The multi-antenna receiver arrangement 400 comprises a channel analyzer 920. The channel analyzer determines characteristics, such as radio channel estimates, e.g., for each of the digital signals based on the extracted reference signals. Furthermore, in some embodiments, the multi-antenna receiver arrangement 400 comprises a set of prefilters (Hij [z]) 821, . . . , 838. Each prefilter 821, . . . , 838 pre-filters a respective antenna branch, i.e., a respective digital signal to obtain pre-filtered digital signals. Based on the determined characteristics (e.g., the radio channel estimates; for each digital signal), a control unit (not shown; comprised in the channel analyzer 920) obtains (e.g., parameters and number of filters of) the set of prefilters 821, . . . , 838 (Hij[z]) to be applied to a respective digital signal (i.e., to each respective antenna; $i=1, \ldots, N$, $j=1, \ldots, m$). The prefilters 821, . . . , 838 are in some embodiments FIR tapped delay line filters with one tap (one tap filters). The channel analyzer 920, or the control unit, utilizes the determined characteristics to determine parameters or parameter values for the set of prefilters 821, . . . , 838. Each of the one tap filters 821, . . . , 838 is associated with a determined characteristics (such as the characteristics determined for a digital signal during the determining step 140 of the method 100). In some embodiments, the determined characteristics is a phase shift, a complex-valued coefficient and/or a delay (of one of the first plurality of digital signals). By implementing the prefilters as one tap filters, memory requirements may be reduced and/or the number of calculations required is reduced, thus reducing power consumption.

The pre-filtered digital signals are then combined in one or more, e.g., m, combiners 841, . . . , 848 to obtain (m) combined (digital) signals. Each of the m combiners 841, . . . , 848 may add the prefiltered digital signals together to create m combined signals. As shown in FIG. 4, all N digital signals are prefiltered with different pre-filters 821, . . . , 838 (each of the pre-filters, e.g., 828, 838, for a specific digital signal may have different parameter values) and added together for each of the m paths/streams comprising combined signals. In some embodiments, the number of paths/streams m is determined. Alternatively, the number of paths/streams m is fixed. In some embodiments, (when the number of paths/streams m is known/has been determined) the number of channel taps comprised in the digital signals is determined, e.g., by the channel analyzer 920. If the number of channel taps comprised in the digital signals is larger than m, then the most significant channel taps are selected (e.g., based on amplitude or power). Thus, only the selected channel taps are combined by the m combiners 841, . . . , 848. In some embodiment the combiner is included in the pre-filter unit, i.e., the pre-filter may be a spatio-temporal filter, simultaneously filtering in time and over the antenna dimension/space (as described in connection with FIG. 1A). In these embodiments, the multi-antenna receiver arrangement 400 comprises m filters, each of the m filters comprising the prefilters H1j, . . . , HNj.

The m combined signals/streams may be further processed. In some embodiments, each combined signal/stream is transformed, e.g., FFT processed, by a transform sub-unit 941, . . . , 948. Furthermore, in some embodiments the transformed signal is post-processed, e.g., in the frequency domain, by post-processing units 961, . . . , 968, e.g., to obtain channel estimates per sub-carrier and/or resource block. Moreover, in some embodiments, the post-processed signals are combined, e.g., using maximum-ratio combining (MRC) or other combining methods on e.g., a sub-carrier basis. Moreover, in some embodiments, the multi-antenna receiver arrangement 400 comprises a decoder 980. Thus, the maximum-ratio combined signal is, in some embodiments, decoded by a decoder 980.

List of Examples

1. A method (100) for a multi-antenna receiver arrangement (400), the multi-antenna receiver arrangement (400) being comprisable in a wireless device, WD, the method comprising:
    receiving (110) a first plurality of analog radio signals;
    converting (120) the first plurality of analog radio signals into a first plurality of digital signals;
    extracting (130) reference signals from each of the first plurality of digital signals;
    determining (140) characteristics for each of the first plurality of digital signals based on the extracted reference signals;
    processing (150) the first plurality of digital signals with a second plurality of spatio-temporal filters to obtain a second plurality of combined signals, wherein the first plurality is larger than the second plurality.
2. The method of example 1, further comprising:
    transforming (160) each of the second plurality of combined signals into a frequency domain;
    post-processing (170) the transformed signals in the frequency domain to obtain a third plurality of frequency domain processed signals; and
    decoding (180) the third plurality of frequency domain processed signals; and wherein the second plurality is larger than the third plurality.
3. The method of any of examples 1-2, wherein the spatio-temporal filters are combining filters and the method further comprises:
    utilizing (146) the determined characteristics to determine parameters for the combining filters.
4. The method of example 3, wherein the first plurality of analog radio signals are received by a first plurality of receivers/transceivers (500, 501, . . . , 515) via a first plurality of antenna units, and wherein each of the combining filters is a one tap filter and wherein each of the one tap filters is associated with a determined characteristics, such as a coefficient, a phase shift and/or a delay, of one of the first plurality of digital signals.
5. A computer program product comprising a non-transitory computer readable medium (200), having stored thereon a computer program comprising program instructions, the computer program being loadable into a data processing unit (220) and configured to cause execution of the method of any of examples 1-4 when the computer program is run by the data processing unit.
6. A multi-antenna receiver arrangement (400), comprising controlling circuitry configured to cause:
    reception (310) of a first plurality of analog radio signals;
    conversion (320) of the first plurality of analog radio signals into a first plurality of digital signals;
    extraction (330) of reference signals from each of the first plurality of digital signals;
    determination (340) of characteristics for each of the first plurality of digital signals based on the extracted reference signals;
    processing (350) of the first plurality of digital signals with a second plurality of spatio-temporal filters to obtain a second plurality of combined signals, wherein the first plurality is larger than the second plurality.

7. The multi-antenna receiver arrangement of example 6, comprising:

a first plurality of receivers/transceivers (500, 501, . . . , 515) configured to receive the first plurality of analog radio signals via a first plurality of antenna units (700, 701, . . . , 715);

a fourth plurality, such as a first plurality, of analog to digital converters (600, 601, . . . , 615) configured to convert the first plurality of analog radio signals into a first plurality of digital signals;

an extraction unit (900) configured to extract reference signals from each of the first plurality of digital signals;

a channel analyzer (920) configured to determine characteristics for each of the first plurality of digital signals based on the extracted reference signals; and a second plurality of spatio-temporal filters (800, . . . , 807) configured to process the first plurality of digital signals to obtain a second plurality of combined signals, wherein the first plurality is larger than the second plurality.

8. The multi-antenna receiver arrangement of example 7, further comprising:

a transform unit (940) configured to transform each of the second plurality of combined signals into a frequency domain;

optionally a post-processing unit (960) configured to post-process the transformed signals in the frequency domain to obtain a third plurality of frequency domain processed signals; and optionally a decoder configured to decode (180) the third plurality of frequency domain processed signals, and wherein the second plurality is larger than the third plurality.

9. The multi-antenna receiver arrangement of example 8 comprising a chip 990, the chip 990 comprising the extraction unit (900), the channel analyzer (920), the second plurality of spatio-temporal filters (800, . . . , 807) and the transform unit (940).

10. The multi-antenna receiver arrangement of example 8, comprising a first chip, the first chip comprising the channel analyzer (920), the transform unit (940), and optionally the post-processing unit (960) and optionally the decoder (980);

a second chip, the second chip comprising the extraction unit (900) and the second plurality of spatio-temporal filters (800, . . . , 807); and a digital interface, DI, configured to interface the first and second chips.

11. A wireless device, WD, comprising the multi-antenna receiver arrangement of any of examples 6-10.

Generally, all terms used herein are to be interpreted according to their ordinary meaning in the relevant technical field, unless a different meaning is clearly given and/or is implied from the context in which it is used. Reference has been made herein to various embodiments. However, a person skilled in the art would recognize numerous variations to the described embodiments that would still fall within the scope of the claims. For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step. In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer e.g., a single) unit. Any feature of any of the embodiments/aspects disclosed herein may be applied to any other embodiment/aspect, wherever suitable. Likewise, any advantage of any of the embodiments may apply to any other embodiments, and vice versa. Hence, it should be understood that the details of the described embodiments are merely examples brought forward for illustrative purposes, and that all variations that fall within the scope of the claims are intended to be embraced therein.

The invention claimed is:

1. A method for a multi-antenna receiver arrangement, the multi-antenna receiver arrangement being comprisable in a wireless device (WD) the method comprising:

receiving a first plurality of analog radio signals; converting the first plurality of analog radio signals into a first plurality of digital signals;

extracting reference signals from each of the first plurality of digital signals;

determining characteristics for each of the first plurality of digital signals based on the extracted reference signals;

utilizing the determined characteristics to determine parameters for a second plurality of spatio-temporal filters; and processing the first plurality of digital signals with the second plurality of spatio-temporal filters to obtain a second plurality of combined signals, wherein the first plurality is larger than the second plurality.

2. The method of claim 1, further comprising:

transforming each of the second plurality of combined signals into a frequency domain; post-processing the transformed signals in the frequency domain to obtain a third plurality of frequency domain processed signals; and decoding the third plurality of frequency domain processed signals; and wherein the second plurality is larger than the third plurality.

3. The method of claim 1, wherein the second plurality of spatio-temporal filters are prefilters.

4. The method of claim 1, wherein the second plurality of spatio-temporal filters are combining filters.

5. The method of claim 4, wherein the first plurality of analog radio signals are received by a first plurality of receivers/transceivers via a first plurality of antenna units, and wherein each of the combining filters is a one tap filter and wherein each of the one tap filters is associated with the determined characteristics of one of the first plurality of digital signals.

6. The method of claim 4, wherein the determined characteristics is one or more of a coefficient, a phase shift, and a delay.

7. A non-transitory computer-readable storage medium storing one or more programs configured to be executed by one or more processors of a processing device, the one or more programs comprising instructions which, when executed by the processing device, causes the processing device to carry out the method according to claim 1.

8. A multi-antenna receiver arrangement, comprising controlling circuitry configured to cause:

reception of a first plurality of analog radio signals;

conversion of the first plurality of analog radio signals into a first plurality of digital signals;

extraction of reference signals from each of the first plurality of digital signals;

determination of characteristics for each of the first plurality of digital signals based on the extracted reference signals;

utilization of the determined characteristics to determine parameters for a second plurality of spatio-temporal filters; and processing of the first plurality of digital signals with the second plurality of spatio-temporal filters to obtain a second plurality of combined signals, wherein the first plurality is larger than the second plurality.

9. The multi-antenna receiver arrangement of claim 8, comprising:

a first plurality of receivers/transceivers configured to receive the first plurality of analog radio signals via a first plurality of antenna units;

a fourth plurality of analog to digital converters configured to convert the first plurality of analog radio signals into the first plurality of digital signals;

an extraction unit configured to extract reference signals from each of the first plurality of digital signals;

a channel analyzer configured to determine characteristics for each of the first plurality of digital signals based on the extracted reference signals; and the second plurality of spatio-temporal filters configured to process the first plurality of digital signals to obtain a second plurality of combined signals, wherein the first plurality is larger than the second plurality.

10. The multi-antenna receiver arrangement of claim 9, further comprising a transform unit configured to transform each of the second plurality of combined signals into a frequency domain.

11. The multi-antenna receiver arrangement of claim 10, further comprising a post-processing unit configured to post-process the transformed signals in the frequency domain to obtain a third plurality of frequency domain processed signals.

12. The multi-antenna receiver arrangement of claim 11, further comprising a decoder configured to decode the third plurality of frequency domain processed signals.

13. The multi-antenna receiver arrangement of claim 11, wherein the second plurality is larger than the third plurality.

14. The multi-antenna receiver arrangement of claim 10 comprising a chip, the chip comprising the extraction unit, the channel analyzer, the second plurality of spatio-temporal filters and the transform unit.

15. The multi-antenna receiver arrangement of claim 10, comprising a first chip, the first chip comprising the channel analyzer, and the transform unit; a second chip, the second chip comprising the extraction unit and the second plurality of spatio-temporal filters; and a digital interface (DI) configured to interface the first and second chips.

16. The multi-antenna receiver arrangement of claim 11, comprising a first chip, the first chip comprising the channel analyzer, the transform unit and the post-processing unit; a second chip, the second chip comprising the extraction unit and the second plurality of spatio-temporal filters; and a digital interface (DI) configured to interface the first and second chips.

17. The multi-antenna receiver arrangement of claim 12, comprising a first chip, the first chip comprising the channel analyzer, the transform unit, the post-processing unit and the decoder; a second chip, the second chip comprising the extraction unit and the second plurality of spatio-temporal filters; and a digital interface (DI) configured to interface the first and second chips.

18. The multi-antenna receiver arrangement of claim 10, further comprising:

a first chip, the first chip comprising the transform unit;

a second chip, the second chip comprising the extraction unit, the channel analyzer, and the second plurality of spatio-temporal filters; and a digital interface (DI) configured to interface the first and second chips.

19. The multi-antenna receiver arrangement of claim 10, further comprising a baseband chip, the baseband chip comprising:

the extraction unit;

the channel analyzer;

the second plurality of spatio-temporal filters; and the transform unit.

20. The multi-antenna receiver arrangement of claim 19, wherein the baseband chip further comprises:

a post-processing unit configured to post-process the transformed signals in the frequency domain to obtain a third plurality of frequency domain processed signals;

a decoder configured to decode the third plurality of frequency domain processed signals; and/or the fourth plurality of analog to digital converters.

* * * * *